United States Patent [19]
Brennan

[11] Patent Number: 5,740,392
[45] Date of Patent: Apr. 14, 1998

[54] METHOD AND APPARATUS FOR FAST DECODING OF 00H AND 0FH MAPPED INSTRUCTIONS

[75] Inventor: Bob Brennan, Saratoga, Calif.

[73] Assignee: Intel Corporation, Santa Clara, Calif.

[21] Appl. No.: 579,419

[22] Filed: Dec. 27, 1995

[51] Int. Cl.$^6$ ........................................................ G06F 9/30
[52] U.S. Cl. .................... 395/386; 364/259.9; 364/942.8
[58] Field of Search .................................. 395/384, 385, 395/386, 388

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,113,515 | 5/1992 | Fite et al. | 395/425 |
| 5,187,679 | 2/1993 | Vassiliadis | 364/786 |
| 5,438,668 | 8/1995 | Coon et al. | 395/375 |
| 5,572,682 | 11/1996 | Garibay et al. | 395/250 |

OTHER PUBLICATIONS

J. Shipnes, *Graphics Processing with the 88110 RISC Microprocessor*, IEEE (1992), pp. 169–174.
*MC88110 Second Generation RISC Microprocessor User's Manual*, Motorola Inc. (1991).
*Errata to MC88110 Second Generation RISC Microprocessor User's Manual*, Motorola Inc. (1992), pp. 1–11.
*MC88110 Programmer's Reference Guide*, Motorola Inc. (1992), pp. 1–4.
*i860™ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.
*TMS320C2x User's Guide*, Texas Instruments (1993) pp. 3-2 through 3-11; 3-28 through 3-34; 4-1 through 4-22; 4-41; 4-103; 4-119 through 4-120; 4-122; 4-150 through 4-151.
L. Gwennap, *New PA-RISC Processor Decodes MPEG Video*, Microprocessor Report (Jan. 1994), pp. 16, 17.
SPARC Technology Business, *UltraSPARC Multimedia Capabilities On–Chip Support for Real–Time Video and Advanced Graphics*, Sun Microsystems (Sep. 1994).

(List continued on next page.)

*Primary Examiner*—David Y. Eng
*Attorney, Agent, or Firm*—Blakely, Sokoloff, Taylor & Zafman

[57] ABSTRACT

A method and apparatus for fast decoding of 00H and 0FH mapped instructions. A set of instruction bytes are selected for length decoding. Instruction bytes that contain no length information, such as 0FH opcode bytes in the Intel architecture instruction set, are detected and shifted out of the set before length decoding to determine the length of an instruction is performed on the set. Removing instruction bytes that contribute no length information allows the length decoder logic to be optimized for size and speed. In one embodiment, parallel length decoder sets that each include a detector, shifter, and length decoder operate in parallel on a line of instruction bytes prefetched from an instruction cache. In one embodiment, the length decoders are PLAs (programmable logic arrays) that are combined with separate shifters and detectors logic. This embodiment advantageously allows smaller PLA length decoders. In another embodiment, each set of detector, shifter, and length decoder is implemented in a single PLA. In this embodiment, the detector/shifter/length decoder PLAs are larger but can be optimized for greater overall speed. The present invention is advantageously used to determine the length of multiple variable length instructions before the instructions are decoded for execution.

24 Claims, 9 Drawing Sheets

OTHER PUBLICATIONS

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 1994), pp. 12–18.

N. Margulis, *i860 Microprocessor Architecture*, McGraw Hill, Inc. (1990) Ch. 6, 7, 8, 10, 11.

*Pentium Processor User's Manual Volume 3: Architecture and Programming Manual*, Intel Corporation (1993), Ch. 1, 3, 4, 6, 8, and 18.

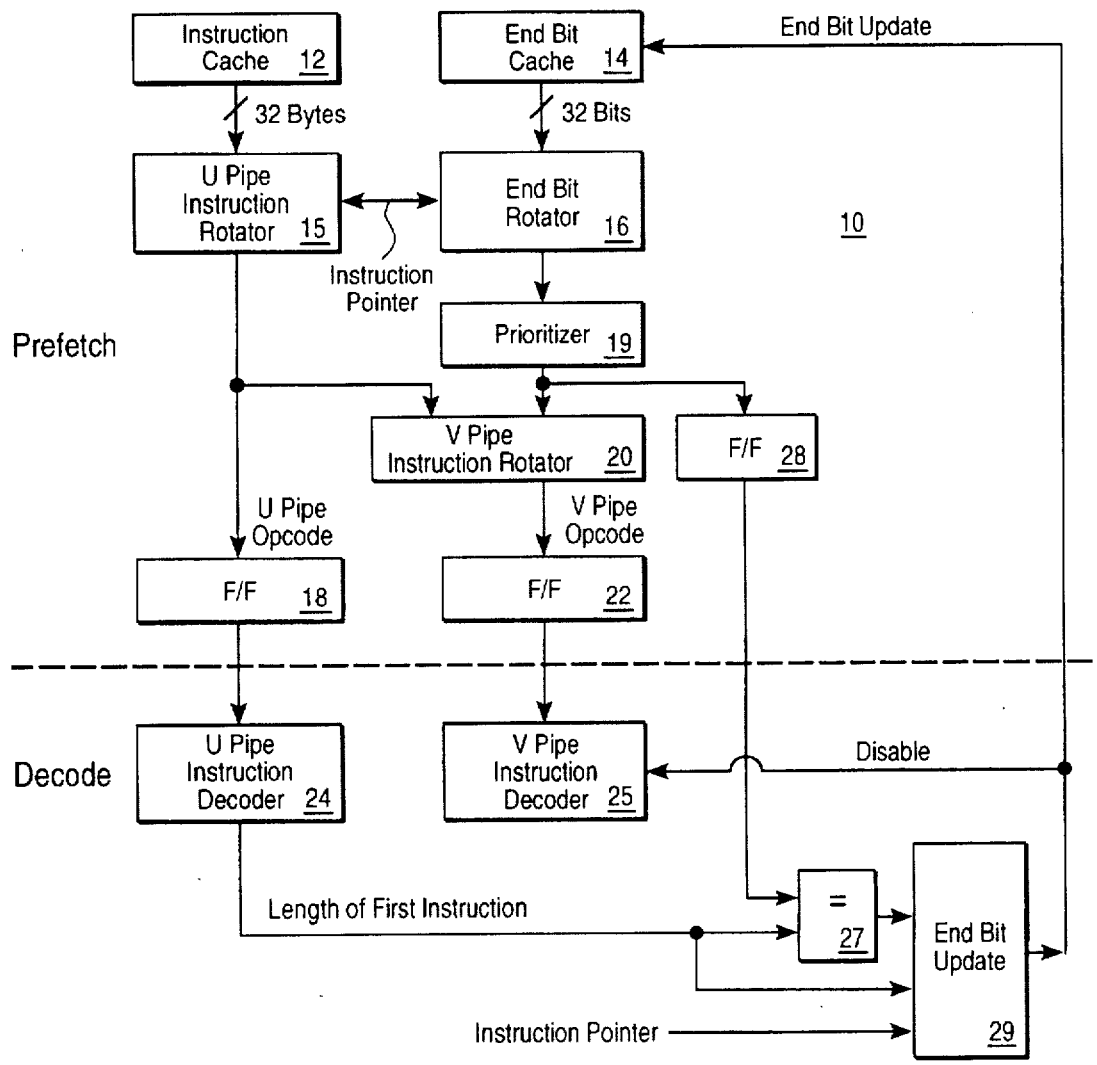

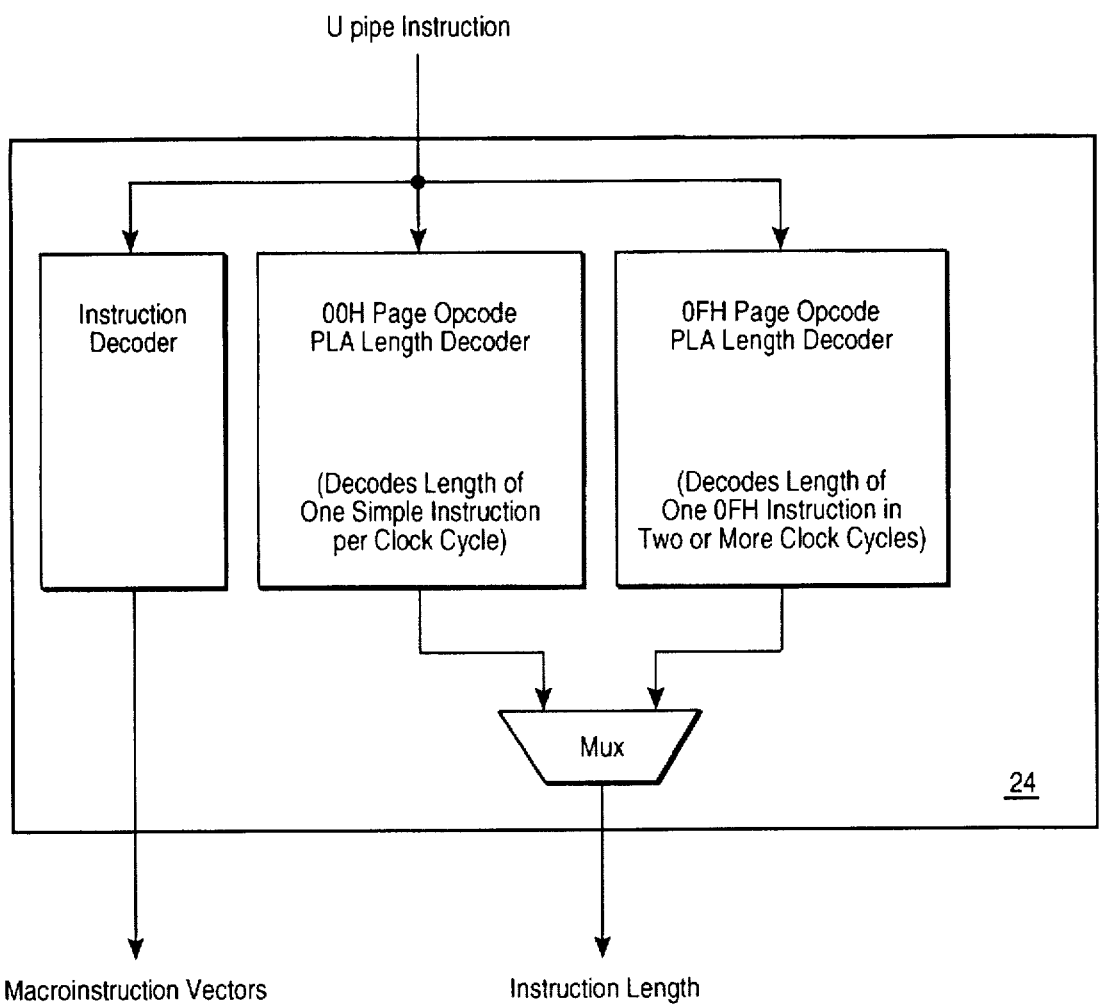
FIG_3 (PRIOR ART)

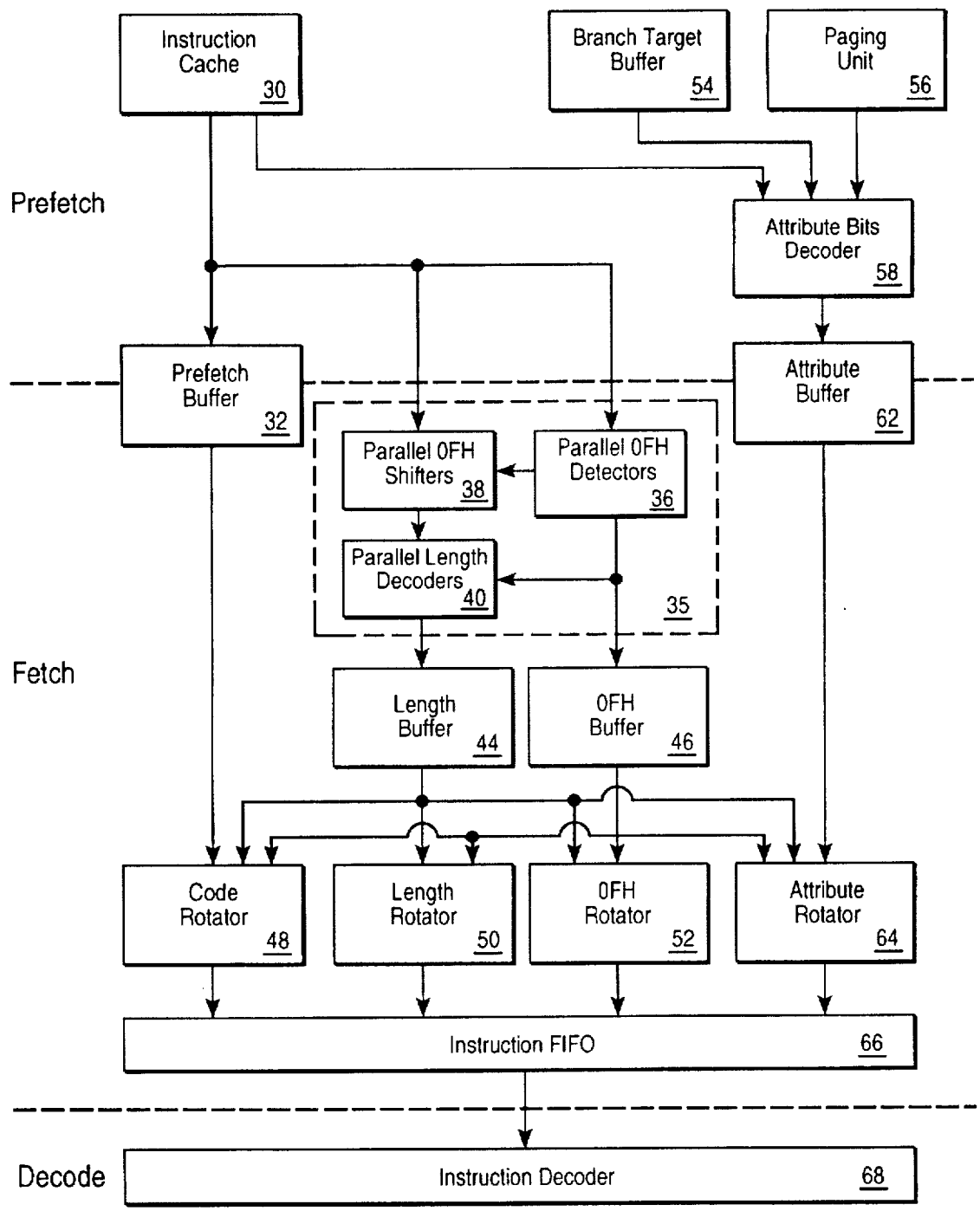
FIG_4

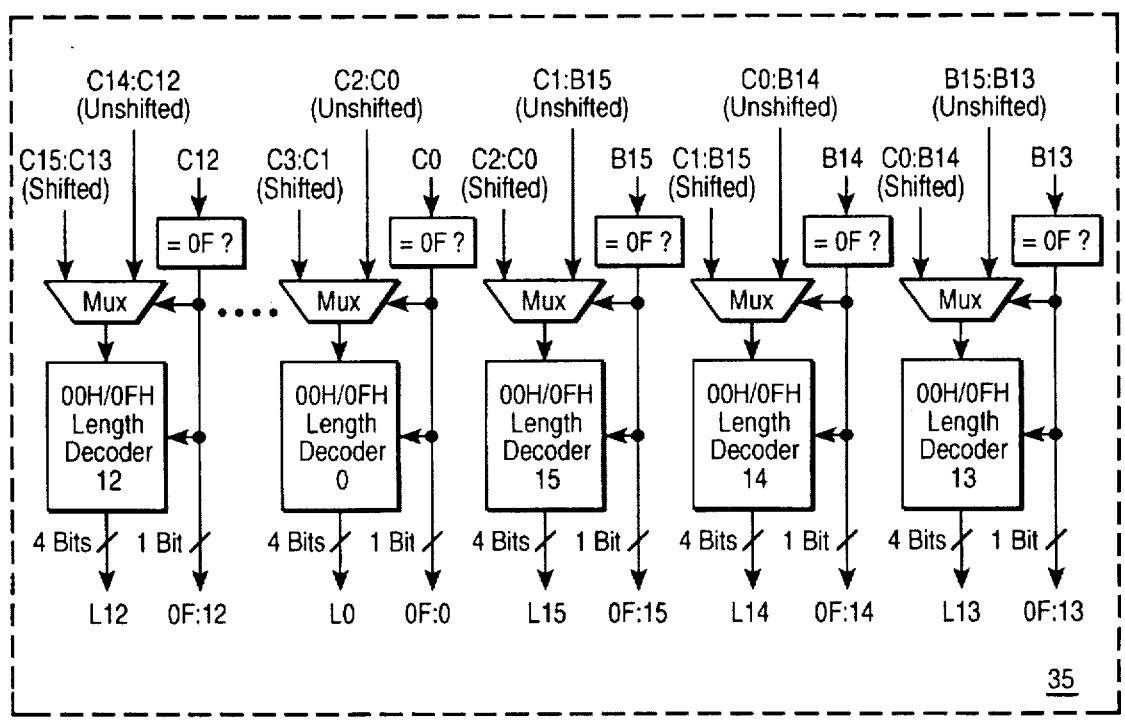
FIG_5

FIG_6

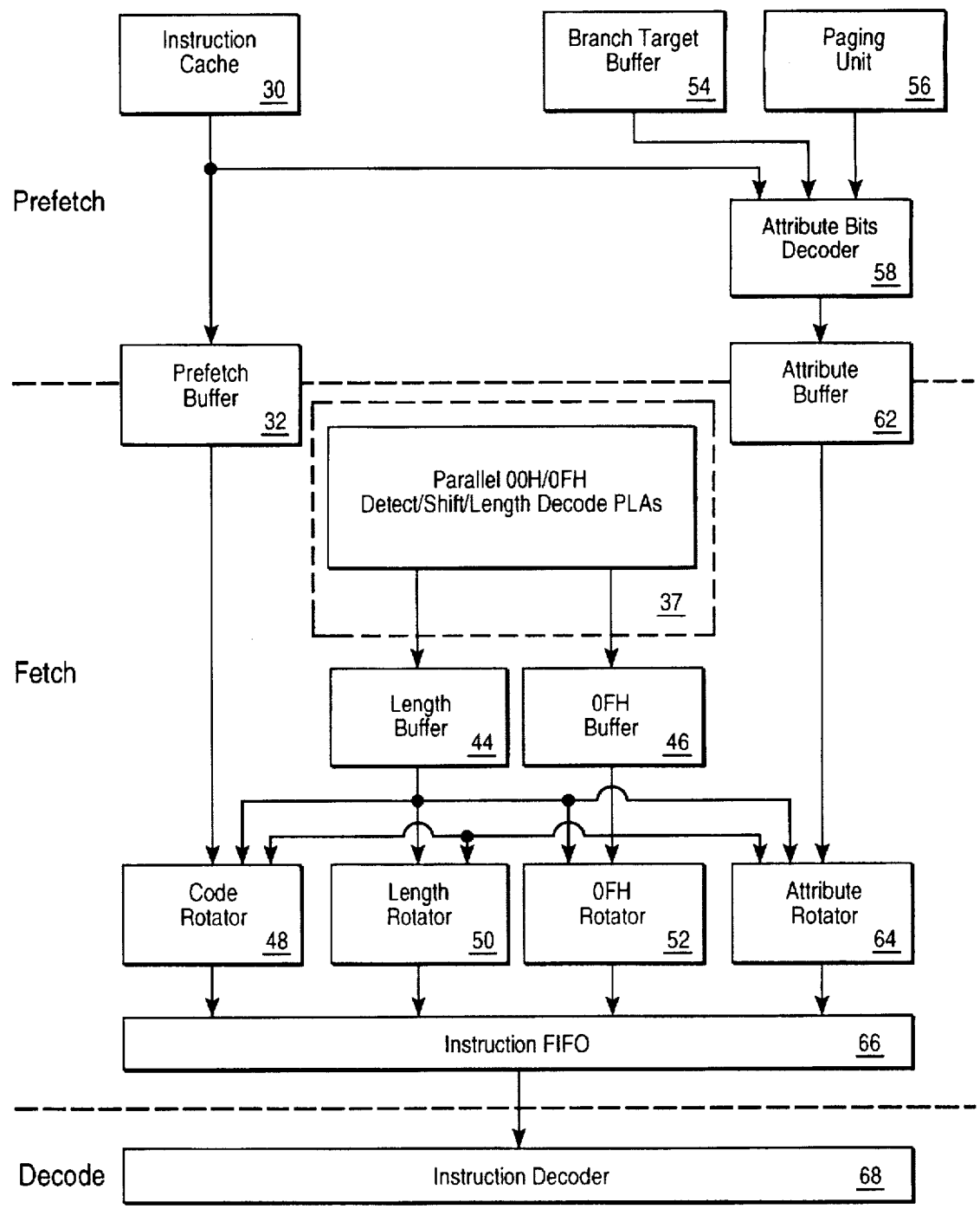
FIG_7

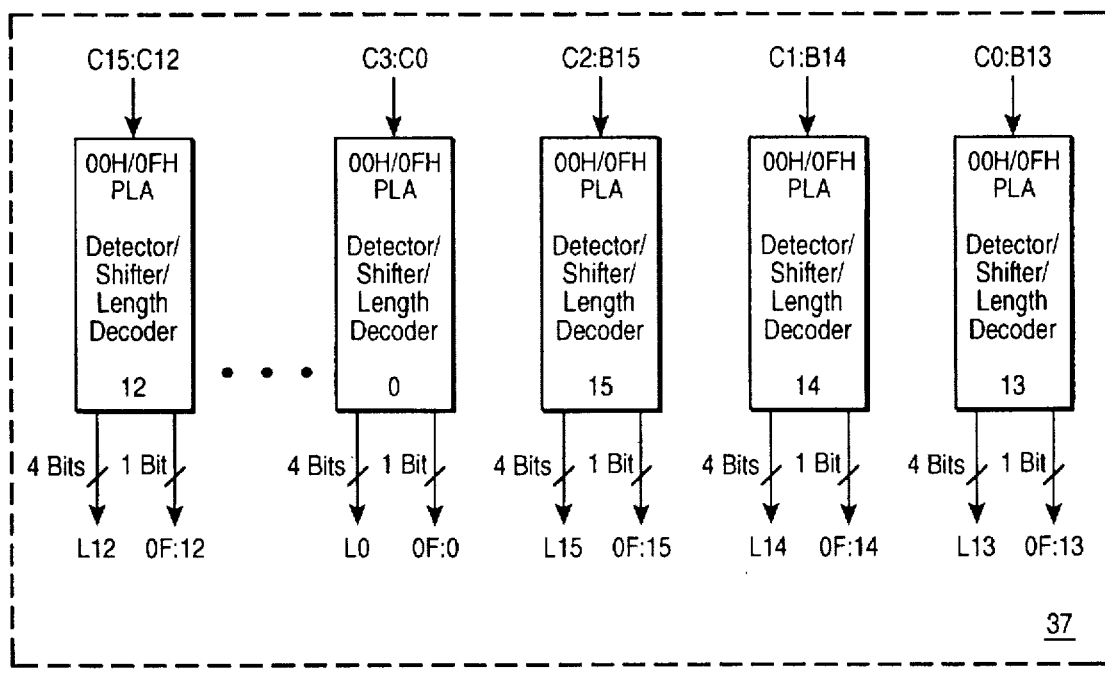
FIG_8
FIG_9

Instruction Bytes in Prefetch Buffer Locations:                                                                                                                              Step 100
Loc:   C15  C14  C13  C12  C11  C10  C9   C8   C7   C6   C5   C4   C3   C2   C1   C0   B15  B14  B13
Byte:  6E   0F   01   00   06   FC   0F   05   6E   0E   01   00   06   FC   0F   05   6E   0F   00                                                                          Step 102
0F Bits from 0F Detectors 36:
       0         0              0         1         0              0         1         0         1    0

Length Values from Length Decoders 40:                                                                                                                                       Step 104
       X    X    X    X    X    X    5    X    0    X    X    X    X    X    5    X    X    3    X Attribute Values from Attribute Bits Decoder 58 [Order of Bits is: 1) Predicted Branch Taken, 2) Predicted, 3) Page Violation, and 4) Valid]:                                 Step 106
       1111 1110 1101 1101 1100 1010 1001 1000 0111 0110 0101 0101 0100 0011 0010 0001 0000 1111 1110 1101

First and Second Stages of Rotation by Code Rotator 48, Length Rotator 50, 0F Rotator 52, and Attribute Rotator 64:                                                          Step 108
Inst:  6E   0F   01   00   06   FC   0F   05   6E   0E   01   00   06   FC   0F   05   6E   0F   00
0F Byte:    0              0         1         0              0         1         0         1    0
Length:X    X    X    X    X    X    5    X    0    X    X    X    X    X    5    X    X    3    X
Att:   1111 1110 1101 1101 1100 1010 1001 1000 0111 0110 0101 0101 0100 0011 0010 0001 0000 1111 1110 1101

Third Stage of Rotation (Shifts Out 0FH Byte in First Instruction of Present):                                                                                               Step 110
Inst:  6E   0F   01   00   06   FC   0F   05   6E   0E   01   00   06   FC   0F   05   6E   0F   00

Fourth Stage of Rotation Selects the First and Second Instructions and Associated Information to Send to Instruction FIFO 66:                                                Step 112
Inst:  6E   0F   01   00   06   FC   0F   05   6E   0E   01   00   06   FC   0F   05   6E   0F   00
0F Bytes:   0              0         1         0              0         1         0         1    0
Length:X    X    X    X    X    X    5    X    0    X    X    X    X    X    5    X    X    3    X
Att:   1111 1110 1101 1101 1100 1010 1001 1000 0111 0110 0101 0101 0100 0011 0010 0001 0000 1111 1110 1101

Information Sent to Instruction FIFO 66:                                                                                                                                     Step 114
  Order of Attribute Bits Stored in FIFO 66 is: 1) a Predicted Branch Taken Bit (From LSB), 2) a Predicted Bit (from LSB),
  3) a Page Violation Bit (from MSB), 4) a Valid Bit (from LSB), and 5) a Valid Bit from the Fourth Instruction Byte, if any.

| Inst.  | 0F | Length | Prefix | Attribute Bits | Instruction |
|--------|----|--------|--------|----------------|-------------|
| First  | 1  | 3      | None   | 0 0 0 1        | 05 6E       |
| Second | 1  | 5      | None   | 0 1 1 0 0      | 01 00 06 FC |

FIG. 11

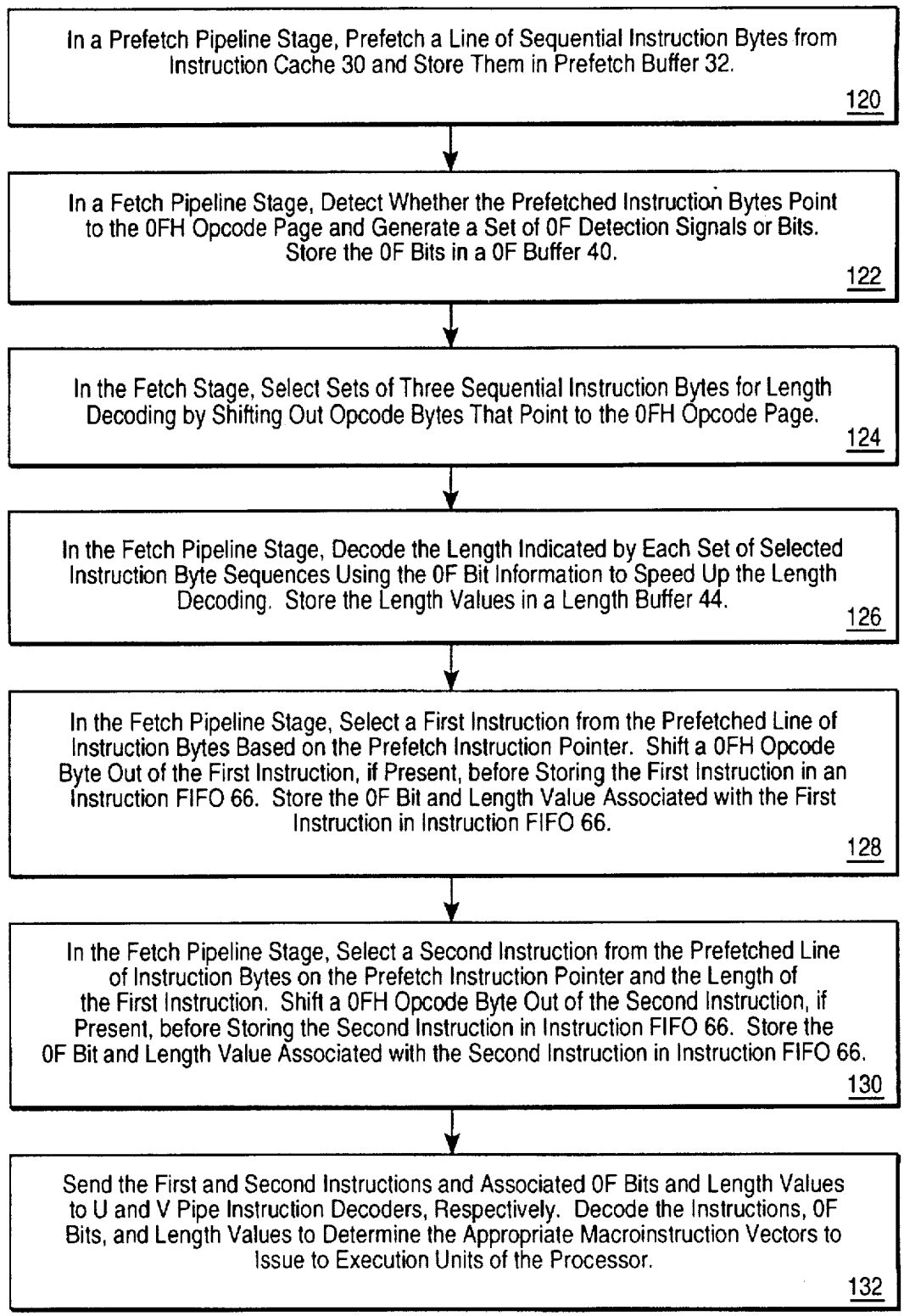
FIG_11

METHOD AND APPARATUS FOR FAST DECODING OF 00H AND 0FH MAPPED INSTRUCTIONS

RELATED APPLICATIONS

This patent application is related to the following patent application which is assigned to the assignee of the present invention and filed concurrently herewith: patent application Ser. No. 08/579,420, entitled *Method and Apparatus for Efficient Propagation of Attribute Bits in an Instruction Decoding Pipeline*.

BACKGROUND OF THE INVENTION

1. Field of the Invention

The present invention relates generally to decoding of a stream of variable length instructions of a microprocessor, and more specifically to fast decoding of variable length instructions of which some are mapped to a 00H (or primary) page of opcodes and others to a 0FH (or secondary) page of opcodes.

2. Related Art

Microprocessors execute a defined set of instructions. Individual instructions are represented by a unique binary encoding called an opcode. The microprocessor fetches, decodes, and executes the instructions. Certain instructions may be more important to processor performance than others. In this case, a particular microprocessor microarchitecture design may be optimized to decode and execute the more performance-critical instructions at the expense of slower decoding or execution of other instructions.

For example, instructions of today's commercially available Intel architecture processors (such as the Pentium® family of processors available from Intel Corporation, Santa Clara Calif.) are represented by one or two-byte opcodes. The opcodes may be followed by one or more operands that provide additional information needed by the instruction to carry out its task. Each instruction opcode is mapped onto one of two opcode pages, 00H or 0FH. 00H is the primary opcode page while 0FH is the secondary opcode page. 00H page instruction opcodes are one or two byte opcodes where the most significant byte is not 0FH. 0FH page instruction opcodes are two byte opcodes having a most significant byte of 0FH.

As a general rule in today's commercially available Intel architecture processors, the more performance-critical instructions are mapped to the 00H opcode page while less performance-critical instructions are mapped to the 0FH opcode page. Because of this mapping, the instruction decoder of today's commercially available Pentium® processor is optimized to decode and issue two 00H page instructions per clock cycle, but incurs a penalty of one or more clock cycles when decoding most 0FH-mapped instructions. This microarchitecture design tradeoff, primarily made in the length decoding arrangement of the instruction decode logic, impacts overall processor performance by only about 1% for typical code and allows smaller PLA length decoders.

FIG. 1 illustrates the components of instructions used in Intel architecture processors. As shown in FIG. 1, an instruction may consist of several variable length fields. An instruction may include from zero to fifteen bytes of prefix information, one or two bytes of opcode information, zero or one byte of Mod R/M information (indicates which registers are to be used), zero or one byte of SIB (scaled index base) information, zero, one, two, or four bytes of displacement information, and zero, one, two, or four bytes of immediate information. Instructions of Intel architecture processors can vary from one to fifteen bytes in length. Further details of the instruction format of Intel architecture processors are found in chapter 25 of the publication entitled *Pentium Processor User's Manual; Volume 3: Architecture and Programming Manual*, Intel Corporation 1995, which is incorporated herein by reference. The variable length instructions of Intel architecture processors are furnished to the processor as a sequential stream of bytes in which no instruction is differentiated from any other.

Length decoding is an important part of decoding variable length instructions. For example, i486™ processors and earlier Intel architecture processors fetch an instruction based on an instruction pointer, decode the instruction for execution, and determine the length of the instruction. The instruction length is then added to the instruction pointer to point to the next instruction to be fetched and decoded. Thus, i486 processors and earlier Intel architecture processors fetch and decode instructions serially incrementing the instruction pointer by the last decoded instruction length to point to the next instruction.

Today's commercially available Pentium® processors have a dual-pipeline superscalar architecture. To optimally keep the dual execution pipelines busy the instruction decoder needs to decode and issue two instructions simultaneously per clock cycle. However, to select the correct starting point for a second (or next) instruction, the instruction decoder must know where the first instruction ends. In addition, in order to properly increment the instruction pointer, the instruction decoder must also know where the second instruction ends.

FIG. 2 illustrates a block diagram of a prior arrangement for indicating the length of instructions in the prefetch pipeline stage without decoding the length of the instructions until a later decode pipeline stage. This arrangement is described in detail in U.S. Pat. No. 5,450,605, entitled *End Bit Markers For Instruction Decode*, E. Grochowski et al, and assigned to the assignee of the present invention which is incorporated herein by reference. In the prior arrangement, instructions are decoded and executed in a pipeline that consists of prefetch, decode, and execute stages. The prefetch stage prefetches sequential instruction bytes from storage and aligns two sequential instructions for decoding based on the instruction pointer and an end bit indication of the end of the first instruction. In the next clock cycle the decode stage decodes the type and actual length (or end) of the two instructions.

End bit cache 14 stores an end bit corresponding to each byte of code stored in instruction cache 12. An end bit value of '1' indicates the end of an instruction. Since no determination of instruction length is made in the prefetch stage, new instruction bytes stored in instruction cache 12 are speculatively assigned a length of one byte. In other words, the corresponding end bits of all new instruction bytes loaded into instruction cache 12 are set to '1'.

In the prefetch stage rotators 15 and 20 select two sequential instructions for decoding based on the instruction pointer and the end bit of the first instruction. If later, in the decode stage, the U pipe instruction decoder 24 determines that the end bit indication for the first instruction was incorrect, the second instruction in the V pipe instruction decoder 25 is canceled because the starting pointer of the second instruction (based on the incorrect first instruction end bit indication) was incorrect. Incorrect end bits for instructions in the U pipe are later corrected by end bit update circuit 29 based on the instruction length decoding done in the decode stage of the pipeline. Thus, FIG. 2 shows an arrangement for indicating the length of instructions without the need to decode the instruction length before decoding the type of instruction. However, the arrangement incurs clock penalties in decoding instructions that are longer than one byte.

FIG. 3 is a block diagram of U pipe instruction decoder 24. U pipe instruction decoder 24 includes an instruction decoder that receives an instruction and determines the appropriate macroinstruction vector to be issued to the execution units. A 00H page length decoder is optimized to decode lengths of instructions mapped to the 00H opcode page and a selected few 0FH-mapped instructions in one clock cycle. 0FH length decoding logic decodes the length of 0FH-mapped instructions in two or more clock cycles, thereby introducing delays into the decoding pipeline for most 0FH-mapped instructions. For the purposes of this discussion, V pipe instruction decoder 25 is essentially the same as U pipe instruction decoder 24 (FIG. 2).

Thus, the prior instruction decoder of FIG. 2 incurs clock penalties in the prefetch stage when end bit indications are incorrect. This is always the case for new instructions that are more than one byte long, such as 0FH-mapped instructions. Additional clock penalties are incurred in the decode stage for most 0FH-mapped instructions because the 0FH length decoders of instruction decoders 24 and 25 take two or more clock cycles to decode 0F instructions.

The above design tradeoff of optimizing decoding of only 00H-mapped and a selected few 0FH-mapped instructions can present a problem when new performance-critical instructions are later added to the 0FH opcode page. For example, adding SIMD (single instruction multiple data) instructions (i.e., packed data instructions) to Pentium processors could greatly enhance their performance in handling multimedia data, such as sound and video information. The execution latency of these instructions would be critical to the processor's performance in manipulating multimedia data types. For various reasons it may be desirable to map the new SIMD instructions to the 0FH opcode page. In this case, the clock penalties incurred by the prior instruction decode unit when decoding 0FH-mapped instructions would be unacceptable.

Therefore, a method and apparatus for fast decoding of 00H and 0FH mapped instructions is needed.

SUMMARY OF THE INVENTION

The present invention is a method and apparatus for fast decoding of 00H and 0FH mapped instructions.

In one embodiment the present invention includes an apparatus for decoding the length of variable length instructions embedded in an instruction stream without differentiation. Each instruction includes one or more blocks. Some types of blocks contain no instruction length information. A detector receives a first block and generates a detector signal that indicates whether or not the first block contains instruction length information. A shifter is coupled to the detector. The shifter selects a first set of instruction blocks that includes the first block if the first block is a type that contains length information. The shifter selects a second set of blocks that does not include the first block if the first block is a type that does not contain length information. A length decoder decodes the set of blocks selected by the shifter to determine an instruction length.

BRIEF DESCRIPTION OF THE DRAWINGS

The present invention is illustrated by way of example and not limitation in the figures of the accompanying drawings, in which like references indicate similar elements.

FIG. 1 illustrates the components of instructions used in Intel architecture processors.

FIG. 2 illustrates a block diagram of a prior arrangement for indicating the length of instructions in the prefetch pipeline stage without decoding the length of the instructions until a later decode pipeline stage.

FIG. 3 is a block diagram of U pipe instruction decoder 24 and V pipe instruction decoder 25 of FIG. 2.

FIG. 4 is a block diagram of one embodiment of the present invention having parallel sets 35 of 0FH detectors 36, 0FH shifters 38, and length decoders 40.

FIG. 5 is a detailed block diagram of one embodiment of prefetch buffer 32 and block 35 (the parallel 0FH detectors, 0FH shifters, and length decoders) of FIG. 4.

FIG. 6 is a block diagram showing, in one embodiment, a one-to-one correspondence between instruction bytes stored in prefetch buffer 32, length values stored in length buffer 44, 0F bits stored in 0FH buffer 46, and attribute bits stored in attribute buffer 62.

FIG. 7 is a block diagram of an embodiment of the present invention having parallel 00H/0FH PLAs 37 that incorporate 0FH detection, 0FH shifting, and length decoding in the PLAs.

FIG. 8 is a detailed block diagram of one embodiment of the parallel 00H/0FH PLAs 37 of FIG. 7.

FIG. 9 illustrates the instruction information stored in instruction FIFO 66 in one embodiment.

FIG. 10 illustrates an example operation of one embodiment of the instruction decoder of the present invention.

FIG. 11 is a flowchart of one embodiment of the present invention method for fast decoding of 00H and 0FH-mapped instructions.

DETAILED DESCRIPTION OF THE PRESENT INVENTION

A method and apparatus for fast decoding of 00H and 0FH-mapped instructions is described. In the following description, numerous specific details such as instruction lengths in byte increments, numbers and arrangement of parallel decoders, bit formats, instruction formats, positions of opcode page pointer (0FH) bytes, length decoding schemes, and instruction rotation or selection schemes are set forth in order to provide a thorough understanding of the present invention. It will be apparent, however, to one skilled in the art that the present invention may be practiced without these specific details. In other instances, well-known methods and circuits are shown in block diagram form in order not to obscure the present invention.

Intel architecture instructions are variable length and appear in an instruction stream without differentiation. Each instruction is made up of one or more instruction bytes. However, the present invention may be applied to decoding instructions having other size instruction blocks. For purposes of this description, instructions are described as appearing in the instruction stream from most significant byte to least significant byte. However, the invention is not limited to this instruction ordering.

Length Decoding

FIG. 4 is a block diagram of one embodiment of the present invention instruction decoder having parallel sets 35 of 0FH detectors 36, 0FH shifters 38, and length decoders 40. The instruction pipeline has three stages that are important to an understanding of the present invention: prefetch, fetch, and decode. During the prefetch stage instruction bytes are prefetched from instruction cache 30 and stored in prefetch buffer 32. Attribute bits for the prefetched instruction bytes are generated and stored in corresponding locations in attribute buffer 62.

During the fetch stage, lengths of instructions embedded in the prefetched instruction bytes are determined and stored in corresponding locations in length buffer 44. 0FH detectors 36 generate bits indicating whether the prefetched instruction bytes are 0FH bytes and store the 0F bits in corresponding locations in 0FH buffer 46. Therefore, each instruction byte stored in prefetch buffer 32 has a corresponding length indication in length buffer 44, a corresponding 0F bit in 0FH buffer 46, and a corresponding set of attribute bits in attribute buffer 62. Finally, the code rotator 48 parses the instruction bytes in the prefetch buffer to provide up to two instructions per clock cycle to instruction FIFO 66. In a corresponding manner, length rotator 50, 0FH rotator 52, and attribute rotator 64 provide corresponding length values, 0F bits, and attribute bits for up to two instructions per clock cycle to the instruction FIFO 66. FIG. 9 shows the information stored for each instruction in the instruction FIFO 66 in one embodiment. Prefix information is decoded separately. An understanding of the decoding and handling of prefix information is not necessary to an understanding of the present invention.

In the decode stage, instruction FIFO 66 provides two instructions and associated length, 0F, and attribute information to instruction decoder 68. Instruction decoder 68 includes a U pipe instruction decoder and a V pipe instruction decoder that decode the instructions and issue the appropriate macroinstruction vectors to the execution units of the processor. Note that no length decoding occurs in the decode stage of the pipeline in contrast to the prior instruction decoder arrangement of FIG. 2.

Instruction cache 30 stores copies of instructions that are fetched from external memory for execution by the microprocessor. In one embodiment instruction cache 30 is 16K byte SRAM with a 32-byte line length. Instruction cache 30 provides sixteen instruction bytes per clock cycle to prefetch buffer 32 and block 35. Of course, other sizes or types of instruction cache can be used and other numbers of instruction bytes can be provided.

Prefetch buffer 32 stores instruction bytes that have been prefetched from instruction cache 30, or other storage locations. FIGS. 5 shows one embodiment of prefetch buffer 32. In this embodiment, prefetch buffer 32 has four lines A, B, C, and D, each having sixteen bytes of storage. Of course, other sizes or arrangements of prefetch buffers can be used. For purposes of describing the present invention, the order of storing instruction bytes from an instruction stream in prefetch buffer 32 is line A, positions A0 to A15, then line B, positions B0 to B15, then line C, positions C0 to C15, then line D, positions D0 to D15, and then returning to line A again.

Returning to FIG. 4, parallel 0FH detectors 36, parallel 0FH shifters 38, and parallel length decoders 40 provide fast length decoding of the instruction bytes received from instruction cache 30. In one embodiment, the length decoders 40, 0FH detectors 36, and 0FH shifters 38 are arranged so that each length decoder 40 has a corresponding detector 36 and shifter 38. Note that in the present invention instruction length decoding occurs before the instructions are decoded in the decode stage of the pipeline for later execution in the execution stage of the pipeline.

In one embodiment 0FH detectors 36 determine whether a set of instruction bytes are 0FH bytes. Recall that in the Intel architecture 0FH-mapped instructions have 0FH as their most significant opcode byte. The 0FH bytes is a pointer to the 0FH opcode page. 0FH detectors 36 generate a set of 0F signals (i.e., detector signals) that indicate whether the corresponding instruction bytes are 0FH (i.e., point to a secondary opcode page). In one embodiment, a 0F signal is set to '1' if the corresponding instruction byte is 0FH and to '0' for any other value. In other embodiments, the 0F signal can have other values. In one embodiment 0FH detectors 36 are comparators implemented with combinational logic. In other embodiments, other types of detectors could be used. In association with other instruction sets, other embodiments of the detectors would detect other types of pointers to various opcode pages. The pointers may also occur in other positions within an instruction. In yet another embodiment, other types of instruction blocks that contain no length information are detected.

The length of Intel architecture instructions can be determined by decoding the most significant nineteen bits of 00H page instructions and the first nineteen bits after the 0FH opcode byte of 0FH instructions. In other words, lengths of Intel architecture instructions can be determined by decoding nineteen sequential bits starting with the most significant byte of 00H page instructions or starting with the byte following the 0FH opcode byte for 0FH page instructions. Therefore, for Intel architecture instructions four sequential instruction bytes can be decoded to determine the length of any instruction if the most significant opcode byte is the most significant byte of the four bytes. For example, assume a four byte instruction window [3:0] where position[0] is the most significant position. If byte[0] is not 0FH, then bytes [2:0] are sufficient to decode the length of a 00H mapped instruction whose most significant opcode byte is in position [0]. If byte[0] is 0FH, then bytes [3:1] are sufficient to decode the length of a 0FH mapped instruction whose most significant opcode byte is in position[0].

In accordance with the above length decoding scheme, in one embodiment of the present invention each 0FH shifter 38 receives four sequential instruction bytes from instruction cache 30. In one embodiment, instruction cache 30 provides sixteen instruction bytes and there are sixteen corresponding 0FH shifters 38, each 0FH shifter 38 arranged to receive a corresponding instruction byte along with the next three instruction bytes (for example, see FIG. 5). The three sequential bytes including the most significant byte (i.e., bytes [2:0] of the four byte window) are selected if the corresponding 0FH detector 38 does not detect a 0FH byte in the most significant byte. The three sequential bytes not including the most significant byte (i.e., bytes [3:1] of the four byte window) are selected if the corresponding 0FH detector 38 detects a 0FH byte in the most significant byte. This ordering of 0FH detection and instruction byte selection is further illustrated in FIG. 5. 0FH shifters 38 can be implemented using a mux, a shifter, or other circuitry for performing a shifting function.

In association with other instruction sets or other length decoding schemes the detectors 36 and shifters 38 may be arranged in other ways. In any case, the operation of the detectors 36 and shifters 38 is to detect pointers to alternate opcode page(s) (or other types of instruction blocks that contain no instruction length information) and remove the pointer(s) (or other blocks) from the instruction blocks to achieve faster length decoding. Since opcode page pointer(s) contain no length information, removing opcode page pointers before length decoding allows the length decoder to be optimized. In other embodiments, the opcode pointers may be bit(s) or other values and may occur in other positions of the instruction encoding.

Each parallel length decoder 40 receives the instruction bytes selected by the corresponding 0FH shifter 38 and a 0F signal from the corresponding 0FH detector 36. If the selected instruction bytes correspond to an instruction length the length decoder 40 will determine the length of the instruction and store it in a corresponding location in length buffer 44. If no real instruction length is determined, length decoders 40 generate a length of 1 to 11 (based on the random arrangement of the bytes) which is eventually flushed by illegal instruction logic in the decode stage. In one embodiment, the length decoders 40 are individual length decoder PLAs optimized to perform length decoding of 00H and 0FH-mapped instructions. In this embodiment, each length decoder PLA 40 is combined with a separate 0FH shifter 38 and a 0FH detector 36 to allow the length decoder PLAs to be optimized for size. Performing the 0FH detecting and 0FH shifting separately from the length decoder PLAs, as shown in FIGS. 4 and 5, advantageously reduces the size of the length decoder PLAs by about 50%. In other embodiments the length decoders 40 could be implemented using combinational logic, or a PLD (programmable logic device).

Referring to FIG. 5, a detailed block diagram of one embodiment of prefetch buffer 32 and block 35 of FIG. 4 is illustrated. Block 35 includes sixteen parallel sets of 0FH detectors, 0FH shifters, and length decoders. Prefetch buffer 32 is shown with each storage byte labeled to identify the correspondence between the bytes stored in prefetch buffer 32 and the bytes being detected, shifted, and length decoded by block 35. Block 35 is illustrated as operating on instruction bytes corresponding to lines B and C at a time when line C is being loaded from instruction cache 30. In like manner block 35 operates in turn on instruction bytes corresponding to lines C and D, lines D and A, and lines A and B when lines D, A, and B are loaded, respectively.

Refer to length decoder_0 of FIG. 5 and its associated 0FH detector and 0FH shifter logic. Detector/shifter/length decoder set_0 receives bytes[3:0] of the currently prefetched line (line C is illustrated as the currently prefetched line so bytes [C3:C0] are received). The 0FH detector determines whether byte[C0] is 0FH and generates a detector signal 0F:0 accordingly. The mux (shifter) selects bytes [C3:C1] if 0FH is detected, thereby shifting out the 0FH byte. The mux selects bytes [C2:C0] if 0FH is not detected. The length decoder_0 decodes the three selected bytes to generate a length value L0.

Referring to FIG. 4, length decoders 40 store their length indications in length buffer 44 in locations that correspond to the locations of the corresponding instruction bytes in prefetch buffer 32. Likewise, 0F detectors 36 store their 0F bits or signals in corresponding locations in 0FH buffer 46.

FIG. 7 is a block diagram of an embodiment of the present invention having parallel 00H/0FH PLAs 37 that incorporate 0FH detection, 0FH shifting, and length decoding. In this embodiment the functions of 0FH detection, 0FH shifting, and length decoding are all included in the parallel PLAs 37. The overall operation of parallel PLAs 37 is identical to that of block 35 of FIG. 4. This embodiment allows the PLAs 37 to be optimized for speed to be faster than the embodiment of block 35 of FIG. 5. However, incorporating the additional functions makes the PLAs 37 about twice as big as the PLA length decoders that can be used with the embodiment of FIG. 5.

FIG. 8 is a detailed block diagram of one embodiment of the parallel 00H/0FH detect/shift/length decode PLAs 37 of FIG. 7. In accordance with the already-described length decoding scheme, each PLA receives four bytes of the currently prefetched line and performs 0FH detection, 0FH shifting, and length decoding as described above.

FIG. 11 is a flowchart of one embodiment of the present invention method for fast decoding of 00H and 0FH-mapped instructions. The method is explained in connection with the embodiment of FIG. 4. However, in general the method performs the steps of: 1) receiving a sufficient number of instruction bytes to decode the length of an instruction where some of the instruction bytes may contribute no instruction length information; 2) detecting and removing (shifting out) the bytes that contribute no length information; and 3) decoding the remaining instruction bytes to determine the length of instruction(s) embedded in the stream of instructions. FIG. 11 illustrates the case where the 0FH opcode bytes of the Intel architecture instruction set contribute no length information and are shifted out before length decoding. As explained above, this novel technique can be use to improve the speed and size of the length decoders.

At step 120 of FIG. 11, during a prefetch stage of the pipeline a line of sequential instruction bytes are prefetched from instruction cache 30 and stored in prefetch buffer 32.

At step 122, during a subsequent fetch stage of the pipeline the method detects instruction bytes that may contribute no length information (such as 0FH opcode bytes) are present in the prefetched line. A set of 0F bits are generated and stored in 0FH buffer 46. At step 124, still in the fetch stage, shifters 38 select either bytes [2:0] or bytes [3:1] of overlapping "windows" of four instruction bytes depending on the associated 0F bit indication for byte[0] of each window. In this manner, the method removes 0FH opcode bytes that contribute no length decoding information. At step 126, still in the fetch stage, length decoders 40 perform length decoding on each of the selected three-byte sets. The associated 0F bits are used to speed up the length decoders. The length values are stored in length buffer 44.

At steps 128 and 130, still in the fetch pipeline stage, code rotator 48 selects a first and second instructions from the prefetched line of instruction bytes based on the prefetch instruction pointer and the first instruction length. If present, 0FH opcode bytes are shifted out of each instruction before the instruction bytes are stored in an instruction field in instruction FIFO 66. The corresponding 0F bits and length values are stored in 0F and length fields, respectively, in the instruction FIFO 66.

At step 132, the first and second instructions and associated 0F bits and length values are sent to instruction decoder 68. Instruction decoder 68 decodes the type of instructions and issues appropriate macroinstruction vectors to the execution units of the processor.

Attribute Path

Return the prefetch stage of the instruction pipeline of FIG. 4. In one embodiment, for each instruction byte prefetched from instruction cache 30 four attribute bits are generated and stored in attribute buffer 62. In general, attribute bits control how the instructions flow down the instruction decode pipeline (i.e., control how the instructions are handled or executed in the pipeline). The attribute bits generated in this embodiment are defined in Table 1.

TABLE 1

| Attribute Bit Name | Attribute Bits Explanation |
| --- | --- |
| Predicted Branch Taken bit | If set and last instruction byte of an instruction the instruction is a branch that is predicted to be taken. |

TABLE 1-continued

Attribute Bits

| Attribute Bit Name | Explanation |
| --- | --- |
| Predicted bit | If set on the last instruction byte, then the branch is predicted to be taken or not taken. |
| Page Violation bit | Indicates that the instruction code stream accesses a page not present in memory. |
| Valid bit | If set/clear indicates the corresponding instruction byte in the instruction cache is valid/invalid. |

For branch instructions, branch target buffer 54 predicts if branches will be taken and what the offsets will be. Attribute bits decoder 58 receives this information and generates a predicted branch taken bit and a predicted bit for corresponding instruction bytes. In one embodiment, the predicted bit and predicted branch taken bit of the least significant instruction byte are used to tell other units in the pipeline that the branch target buffer has predicted a branch to be taken or not taken. For example the bits can control branch verification logic in the execution stage of the pipeline.

Paging unit 56 generates a paging violation signal for each sixteen byte line in instruction cache 30. Attribute bit decoder 58 receives the paging violation signal and generates a paging violation bit for each prefetched instruction byte of the currently prefetched line. For example, in one embodiment if a paging violation signal for a line is '1' the attribute bit corresponding to each instruction byte in the prefetched line is set to '1'. A paging valid bit set to '1' causes the pipeline to be flushed because the associated instruction code stream accesses a page not present in memory.

Instruction cache 30 generates two i-cache valid signals for each prefetched sixteen byte line, one for the high eight bytes [15:8] and one for the low eight bytes [7:0]. Attribute bit decoder 58 turns the high i-cache valid signal into eight valid bits [15:8] each having the same value as the high i-cache valid signal. Likewise the low i-cache valid signal is used to generate eight valid bits [7:0] having the same value as the low i-cache valid signal. Attribute bits decoder 58 stores the attribute bits in locations in the attribute buffer 62 corresponding to the currently prefetched line of prefetch buffer 32. In one embodiment, the valid bits of the fourth instruction byte and last instruction byte of an instruction determine whether the instruction code stream is valid. Based on the valid bits, invalid instructions in the pipeline are canceled.

Because some of the attribute bits are generated in the prefetch stage but not used until the decode stage, in one embodiment the present invention instruction decoder advantageously stores the attributes in attribute buffer 62 in locations corresponding to their associated instruction bytes in prefetch buffer 32. FIG. 6 is a block diagram showing, in one embodiment, the one-to-one correspondence between instruction bytes stored in prefetch buffer 32, length values stored in length buffer 44, OF bits stored in 0FH buffer 46, and attribute bits stored in attribute buffer 62. The instruction bytes, length values, OF bits, and attribute bits are manipulated in a corresponding manner by the instruction decode logic such that their one-to-one correspondence is maintained.

Returning now to the fetch stage, in one embodiment code rotator 48 parses instruction bytes in the prefetch buffer 32 in four rotation stages to provide up to two instructions per clock cycle to instruction FIFO 66. In the first rotation stage, code rotator 48 selects a thirty-two byte window based on the prefetch pointer from the previous clock cycle. In the second rotation stage, code rotator 48 selects fourteen bytes of the thirty-two bytes based on the prefetch pointer from the current clock cycle. In the third rotation stage, code rotator 14 selects either bytes [13:0] or bytes [13:1] of the fourteen bytes depending on the value of the OF bit corresponding to byte [0]. Thus, the third stage shifts out the 0FH byte if the first instruction is a 0FH-mapped instruction. In the fourth rotation stage, the second instruction is selected based on the length of the first instruction. The fourth stage also shifts out the 0FH byte if the second instruction is a 0FH-mapped instruction (as indicated by the corresponding OF bit).

Rotators for performing the first and second stage rotation are described in detail in U.S. patent application Ser. No. 08/276,089, entitled *Two Stage Window Multiplexors For Deriving Variable Length Instructions From A Stream Of Instructions*, E. Grochowski, and assigned to the assignee of the present invention, which is incorporated herein by reference. In one embodiment the third and fourth stages of rotation are implemented using multiplexors. In another embodiment shift registers are used.

In one embodiment, length rotator 50, 0FH rotator 52, and attribute rotator 64 each include first, second, and fourth rotation stages that operate on length buffer 44, OF buffer 46, and attribute buffer 62, respectively, in a manner similar to the first, second, and fourth stages of code rotator 48. In this manner, length values, OF bits, and attribute bits corresponding to the first and second instructions are selected and sent to instruction FIFO 66. However, length rotator 50, 0FH rotator 52, and attribute rotator 64 do not include the third rotation stage to shift out information corresponding to 0FH bytes of 0FH-mapped instructions. Nor do they shift out information corresponding to 0FH opcode bytes of the second instruction in the fourth rotation stage.

Example

FIG. 10 illustrates an example operation of the instruction decoder of the present invention. The processing of the following sequence of instructions by the present invention instruction decoder is illustrated.

| | Instruction Bytes | | | | | Explanation |
| --- | --- | --- | --- | --- | --- | --- |
| 1. | 0F | 6E | 05 | | | movd (32 bits) EAX <— mem |
| 2. | 0F | FC | 06 | 00 | 01 | paddb |
| 3. | 0F | 6E | 05 | | | movd (32 bits) EAX <— mem |
| 4. | 0F | FC | 06 | 00 | 01 | paddb |
| 5. | 0F | 6E | 05 | | | movd (32 bits) EAX <— mem |

The example of FIG. 10 is explained in conjunction with the embodiment of FIG. 4. At step 100, a line including the above sequence of instructions is prefetched from instruction cache 30 and stored in prefetch buffer 32 in locations B13 through C15. (The above sequence of instructions begin at location B14.) The same instruction bytes are also delivered to block 35.

At step 102, parallel 0FH detectors 36 detect 0FH bytes in positions B14, C1, C6, and C9 and generate OF bits for bytes [C12:B13]. The OF bits are stored in corresponding locations in 0FH buffer 46. Parallel 0FH shifters 38 each select three bytes to send to their corresponding length decoders 40 based on the corresponding OF signal. In this example, shifter__13 selects [B15:B13], shifter__14 selects [C1:B15], shifter__15 selects [C1:B15], shifter__0 selects

[C2:C0], shifter_1 selects [C4:C2], shifter_2 selects [C4:C2], shifter_3 selects [C5:C3], shifter_4 selects [C6:C4], shifter_5 selects [C7:C5], shifter_6 selects [C9:C7], shifter_7 selects [C9:C7], shifter_8 selects [C10:C8], shifter_9 selects [C12:C10], shifter_10 selects [C12:C10], shifter_11 selects [C13:C11], and shifter_12 selects [C14:C12].

At step 104, parallel length decoders 40 length decode their corresponding selected instruction bytes. Length decoder_14 generates a length of 3 (corresponding to instruction #1 above). Length decoder_1 generates a length of 5 (corresponding to instruction #2 above). Length decoder_6 generates a length of 3 (corresponding to instruction #3 above). Length decoder_9 generates a length of 5 (corresponding to instruction #4 above). The other length decoders may also produce invalid length values, shown as X in FIG. 10 because they will later be discarded by invalid instruction logic in the decode stage. The length values are stored in corresponding locations in length buffer 44.

At step 106, attribute bits decoder 58 generates a set of attribute bits for each of the sixteen bytes in the prefetched line. In one embodiment, the attributes bits are those of Table 1 and appear in order from left to right as: 1) predicted branch taken bit, 2) predicted bit, 3) page violation bit, and 4) valid bit. Exemplary values for these bits are shown in FIG. 10. The attribute bits decoder 58 stores the attribute bits in corresponding locations in attribute buffer 62.

At step 108, the first and second stages of code rotator 48 select fourteen bytes based on the prefetch instruction pointer. In this example bytes [C11:B14] are selected. The first and second stages of length rotator 50, 0FH rotator 52, and attribute rotator 64 perform corresponding operations to select the corresponding [C11:B14] length values, 0F bits, and attribute bits, respectively. The values selected by the first and second stages of rotation are those underlined in step 108.

At step 110, the third stage of code rotator 48 selects, based on the [B14] 0F bit, bytes [C11:B15] to shift out the 0FH byte in position [B14]. The selected bytes are underlined in step 110. The third stage selects either 13 of 14 or 14 of 14 of the fourteen selected instruction bytes depending on the 0F bit of the most significant byte in the fourteen-byte window (in this case bit [B14]). Length rotator 50, 0FH rotator 52, and attribute rotator 64 do not perform the third stage of rotation.

At step 112, based on the length values and the 0F bits of the prefetched line the fourth stage of code rotator 48 selects the first and second instructions, shifts out a 0FH opcode byte in the second instruction if present, and stores the first and second instructions in instruction FIFO 66. Length rotator 50 and 0FH rotator 52 select and store the length values and 0F bits corresponding to the most significant bytes of the first and second instructions (in this example positions [B14] and [C1], respectively) in instruction FIFO 66.

The fourth stage of attribute rotator 64 selects the attribute bits corresponding to the first and second instructions. In one embodiment, the attributes for each of the first and second instructions are selected as follows: #1) the predicted branch taken bit corresponding to the least significant instruction byte (LSB) is selected; #2) the predicted bit corresponding to the LSB is selected; #3) the page violation bit corresponding to the most significant instruction byte (MSB) is selected; #4) the valid bit corresponding to the LSB is selected; and #5) the valid bit corresponding to the fourth instruction byte, if present, is selected. The attribute bits selected in this example are underlined in step 112.

At step 114, the first and second instructions and their associated 0F bits, length values, and attribute bits selected by the rotators 48, 50, 52, and 64 are stored in instruction FIFO 66.

Thus, a method and apparatus for fast decoding of 00H and 0FH mapped instructions has been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for decoding the length of variable length instructions embedded in an instruction stream without differentiation, each instruction including one or more blocks, wherein some types of blocks contain no instruction length information, the apparatus comprising:

a detector coupled to receive a first block of the instruction stream, wherein the detector generates a detector signal that indicates whether or not the first block contains instruction length information;

a shifter coupled to the detector, wherein the shifter selects a first plurality of blocks including the first block if the first block contains length information, wherein the shifter selects a second plurality of blocks not including the first block if the first block does not contain length information; and a length decoder, coupled to the shifter, for decoding an instruction length indicated by the selected plurality of blocks.

2. The apparatus of claim 1 wherein the length decoder utilizes the detector signal to decode the instruction length.

3. The apparatus of claim 2 wherein the blocks are bytes and the first block is a first byte, wherein the type of blocks that contain no length information include 0FH bytes, wherein the detector generates 0F signals to indicate 0FH bytes in the instruction stream.

4. The apparatus of claim 3 wherein when the first byte is 0FH the selector selects three sequential bytes immediately following the first byte, wherein when the first byte is not 0FH the selector selects the first byte and the next two bytes immediately following the first byte.

5. The apparatus of either claim 1 or 4 further comprising a plurality of length decoding sets, each length decoding set including the detector, shifter and length decoder, wherein the length decoding sets are arranged to operate in parallel on a corresponding plurality of blocks of the instruction stream.

6. An apparatus for decoding the length of variable length instructions embedded in an instruction stream without differentiation, each instruction including one or more blocks, wherein the instructions are mapped to either a primary or secondary opcode page, the apparatus comprising:

a detector coupled to receive a first block of the instruction stream, wherein the detector generates a detector signal that indicates whether or not the first block points to the secondary opcode page;

a shifter coupled to the detector, wherein the shifter selects a first plurality of blocks, including the first block, for length decoding if the first block does not point to the secondary opcode page, wherein the shifter selects a second plurality of blocks not including the first block if the first block points to the secondary opcode page; and a length decoder, coupled to the shifter, for determining an instruction length indicated by the selected plurality of blocks.

7. The apparatus of claim 6 wherein the length decoder utilizes the detector signal to help determine the instruction length.

8. The apparatus of claim 7 wherein the length decoder is a PLA (programmable logic array) that decodes the length of instructions mapped to both the primary and secondary opcode page.

9. The apparatus of claim 8 wherein the detector is a comparator and the shifter is a mux.

10. The apparatus of claim 7 wherein the length decoder, detector and shifter are implemented in a single PLA, wherein the PLA decodes the length of instructions mapped to both the primary and secondary opcode page.

11. The apparatus of either claims 6, 8 or 10 wherein the blocks are bytes and the first block is a first byte, wherein a 0FH byte points to the secondary opcode page, wherein when the first byte is 0FH the selector selects three sequential bytes immediately following the first byte, wherein when the first byte is not 0FH the selector selects the first byte and the next two bytes immediately following the first byte.

12. The apparatus of claim 6 further comprising a plurality of length decoding sets, each length decoding set including the detector, shifter and length decoder, wherein the length decoding sets are arranged to operate in parallel on a corresponding plurality of blocks of the instruction stream.

13. The apparatus of claim 9 further comprising a plurality of length decoding sets, each length decoding set including the comparator, mux and PLA length decoder, wherein the length decoding sets are arranged to operate in parallel on a corresponding plurality of blocks of the instruction stream.

14. The apparatus of claim 10 further comprising a plurality of the PLAs, wherein the plurality of PLAs are arranged to operate in parallel on a corresponding plurality of blocks of the instruction stream.

15. An apparatus for decoding the length of variable length instructions embedded in an instruction stream without differentiation, each instruction including one or more blocks, wherein the instructions are mapped to either a primary or secondary opcode page, the apparatus comprising:

a plurality of detectors coupled to receive an equally corresponding plurality of blocks of the instruction stream, wherein each detector generates a detector signal that indicates whether or not the corresponding block points to the secondary opcode page;

an equally corresponding plurality of shifters coupled to the detectors, wherein each shifter selects a corresponding first plurality of blocks, including the corresponding block, if the corresponding block does not point to the secondary opcode page, wherein each shifter selects a corresponding second plurality of sequential blocks, not including the corresponding block, if the corresponding block points to the secondary opcode page; and an equally corresponding plurality of length decoders coupled to the shifters, wherein each length decoder decodes the selected corresponding plurality of blocks and corresponding detector signal to determine an instruction length indicated by the selected corresponding plurality of blocks.

16. The apparatus of claim 15 wherein each of the length decoders is a separate PLA that decodes instructions mapped to both the primary and secondary opcode maps, and wherein the detector is a comparator and the shifter is a mux.

17. The apparatus of claim 15 wherein each length decoder and corresponding shifter and detector are implemented in a PLA such that each PLA performs functions of detecting, shifting, and length decoding, wherein each PLA decodes the length of instructions mapped to both the primary and secondary opcode page.

18. An apparatus for decoding the length of variable length instructions embedded in an instruction stream without differentiation, each instruction including one or more instruction bytes, wherein the instructions are mapped to either a primary or secondary opcode page, the apparatus comprising:

a prefetch buffer, wherein the prefetch buffer prefetches and stores therein a plurality of sequential instruction bytes from the instruction stream;

a plurality of 0FH detectors coupled to receive a corresponding plurality of the prefetched instruction bytes, wherein the 0FH detectors generate a corresponding plurality of 0F bits that indicate whether the corresponding plurality of prefetched instruction bytes are 0FH;

an equally corresponding plurality of 0FH shifters, wherein when the corresponding prefetched instruction byte is 0FH the corresponding 0FH shifter selects three sequential instruction bytes immediately following the corresponding prefetched instruction bytes, wherein when the corresponding prefetched instruction byte is not 0FH the corresponding 0FH shifter selects the corresponding prefetched instruction bytes and the next two sequential instruction bytes; and an equally corresponding set of plurality of length decoders, wherein each length decoder determines an instruction length, if any, indicated by the corresponding selected instruction bytes based on the corresponding selected instruction bytes and the corresponding 0F bit.

19. An apparatus for decoding the length of variable length instructions embedded in an instruction stream without differentiation, each instruction including one or more blocks, wherein some types of blocks contain no instruction length information, the apparatus comprising:

means for determining whether a first block of the instruction stream contains instruction length information;

means, coupled to the determining means, for selecting a first plurality of blocks including the first block if the first block contains length information, wherein the selecting means selects a second plurality of blocks not including the first block if the first block does not contain length information; and means, coupled to the selecting means, for decoding the selected plurality of blocks to determine a length of a first variable length instruction that includes the first block.

20. A method for decoding the length of variable length instructions embedded in an instruction stream without differentiation, each instruction including one or more blocks, wherein some types of blocks contain no instruction length information, the method comprising the steps of:

determining whether a first block of the instruction stream contains instruction length information;

selecting a first plurality of blocks including the first block if the first block contains length information;

selecting a second plurality of blocks not including the first block if the first block does not contain length information; and decoding the selected plurality of blocks to determine a length of a first variable length instruction that includes the first block.

21. The method of claim 20 wherein the decoding step utilizes the detector signal to decode the instruction length.

22. A method for decoding the length of variable length instructions embedded in an instruction stream without differentiation, each instruction including one or more blocks, wherein the instructions are mapped to either a primary or secondary opcode page, the method comprising the steps of:

detecting whether or not the first block points to the secondary opcode page;

generating a detector signal that indicates whether or not the first block points to the secondary opcode page;

selecting a first plurality of blocks, including the first block, if the first block does not point to the secondary opcode page;

selecting a second plurality of blocks not including the first block if the first block points to the secondary opcode page; and determining an instruction length indicated by the selected plurality of blocks.

23. The method of claim 22 wherein the instruction length determining step utilizes the detector signal to determine the instruction length.

24. The method of claim 23 wherein the blocks are bytes and the first block is a first byte, wherein a 0FH byte points to the secondary opcode page, wherein when the first byte is 0FH the step of selecting a first plurality of blocks selects three sequential bytes immediately following the first byte, wherein when the first byte is not 0FH the selecting a second plurality of blocks selects the first byte and the next two bytes immediately following the first byte.

* * * * *